United States Patent [19]

Bluhm

[11] 4,086,454

[45] Apr. 25, 1978

[54] BATTERY SUPPORTED LIGHT WITH CIRCUIT MAKER AND BREAKER HAVING TERMINALS AND MOUNTING PLATE DIRECTLY MOUNTED TO BATTERY COIL SPRING ELECTRODES

[76] Inventor: Otto J. Bluhm, 118 Adolph St., Wausau, Wis. 54401

[21] Appl. No.: 698,687

[22] Filed: Jun. 22, 1976

Related U.S. Application Data

[62] Division of Ser. No. 487,253, Jul. 10, 1974, Pat. No. 3,980,989.

[51] Int. Cl.² .................... H01H 1/00; F21L 7/00; F21V 23/04; H01R 13/00
[52] U.S. Cl. ........................... 200/60; 200/237; 339/17 R; 339/152; 362/184; 362/194
[58] Field of Search ............ 200/6 R, 11 R, 60, 276; 240/10.61, 10.65; 362/183, 184, 194; 339/17 R, 17 C, 64 M, 252 R, 254 R, 152, 153; 429/121

[56] References Cited

U.S. PATENT DOCUMENTS

| | | | |
|---|---|---|---|
| 1,434,041 | 10/1922 | Burton | 339/152 X |
| 2,491,914 | 12/1949 | Anderson | 200/60 X |
| 2,492,837 | 12/1949 | Briggs | 200/184 X |
| 2,920,233 | 1/1960 | Hershberger | 200/60 X |
| 3,087,052 | 4/1963 | Torgerson | 240/10.61 |
| 3,157,771 | 11/1964 | Roeser | 260/276 X |
| 3,339,169 | 8/1967 | Freeland | 339/17 R |
| 3,725,625 | 4/1973 | Pratt | 200/276 X |
| 3,743,915 | 7/1973 | Strock | 200/60 X |
| 3,885,848 | 5/1975 | Brouneus | 339/17 C |

*Primary Examiner*—James R. Scott
*Attorney, Agent, or Firm*—Clarence A. O'Brien; Harvey B. Jacobson

[57] ABSTRACT

A mount is provided defining a downwardly opening socket and including a dependingly supported lower marginally extending clamp structure telescopable downwardly over the upper end of an associated upright storage battery and clampably engageable therewith. The downwardly opening socket defined by the mount includes portions thereof through which light rays may be transmitted and a dielectric horizontally disposed panel is received within the socket and has a pair of vertical contact terminals secured therethrough in horizontally spaced relation. The lower portions of the contact terminals project below the dielectric panel and electrically contact and are supported from the upper ends of a pair of horizontally spaced upwardly projecting contact terminal defined coil springs of the associated storage battery, whereby the panel is supported from the terminal defining springs. An open ended conductive material socket for receiving the base of a light bulb is supported from the panel and removably supports the base of a light bulb with the center terminal at the free end of the base of the bulb in contact with the upper end of one of the terminals secured through the dielectric panel and the socket is electrically engaged with the other terminal through a selectively operable switch member supported from the panel.

7 Claims, 7 Drawing Figures

BATTERY SUPPORTED LIGHT WITH CIRCUIT MAKER AND BREAKER HAVING TERMINALS AND MOUNTING PLATE DIRECTLY MOUNTED TO BATTERY COIL SPRING ELECTRODES

This is a division of application Ser. No. 487,253, filed July 10, 1974 now U.S. Pat. No. 3,980,989.

BACKGROUND OF THE INVENTION

The signal light and base of the instant invention have been primarily designed for use in conjunction with conventional upright storage batteries of the type including upwardly projecting terminals. Signal and other lights of similar construction have been heretofore designed. Examples of such previously designed light are disclosed in U.S. Pat. Nos. 2,492,837 to E. C. Briggs, dated Dec. 27, 1949, 2,582,330 to W. J. Hautala, dated Jan. 15, 1952, 2,849,596 to J. A. McDermott, dated Aug. 26, 1958, and 3,087,052 to A. T. Torgerson, dated Apr. 23, 1963.

The lamps disclosed in the aforementioned prior U.S. patents each include lamp portions supported from the upper end of an upright storage battery. However, these lights do not provide ample base structure for insuring steady support of the associated lamp on uneven surfaces and include relatively complex light bulb supporting and switch structures.

The main object of this invention is to provide a lighted signalling device primarily designed for traffic control or regulation as warning and boundary lights on highways and for other uses.

Another object of this invention is to provide a simplified, safe, effective and relatively inexpensive signalling lamp that may be seen from all horizontal directions, that is battery operated and capable of being used with or without an accessory stand readily detachable from the associated storage battery and which will also be capable of being hung from suitable elevated supports, whenever desired.

Yet another object of this invention is to provide a signal lamp which can be used equally effectively during daylight hours by the attachment of an upright flag to the lamp structure.

Still another object of this invention is to provide a signal lamp structure that may be readily modified so as to emit a flashing light and to be automatically energized in respons to the ambient light dropping below a predetermined value.

A still further object of this invention is to provide a signal light including a support base attachment therefor including widely splayed legs which may be readily folded into a compact state for storage.

An ancillary object of this invention is to provide a signal light including means supported therefrom for storage of a spare bulb.

A final object of this invention to be specifically enumerated herein is to provide a signal light in accordance with the preceding objects and which will conform to conventional forms of manufacture, be of simple construction and be easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a fragmentary vertical sectional view illustrating the manner in which the flag element is removably supported from the flag staff structure;

FIG. 6 is a top plan view of the base with the generally radial legs thereof in folded position;

FIG. 7 is an enlarged fragmentary vertical sectional view taken substantially upon the plane indicated by the sectional lines 7—7 of FIG. 1.

DETAILED DESCRIPTION OF THE DRAWINGS

Figure 1:
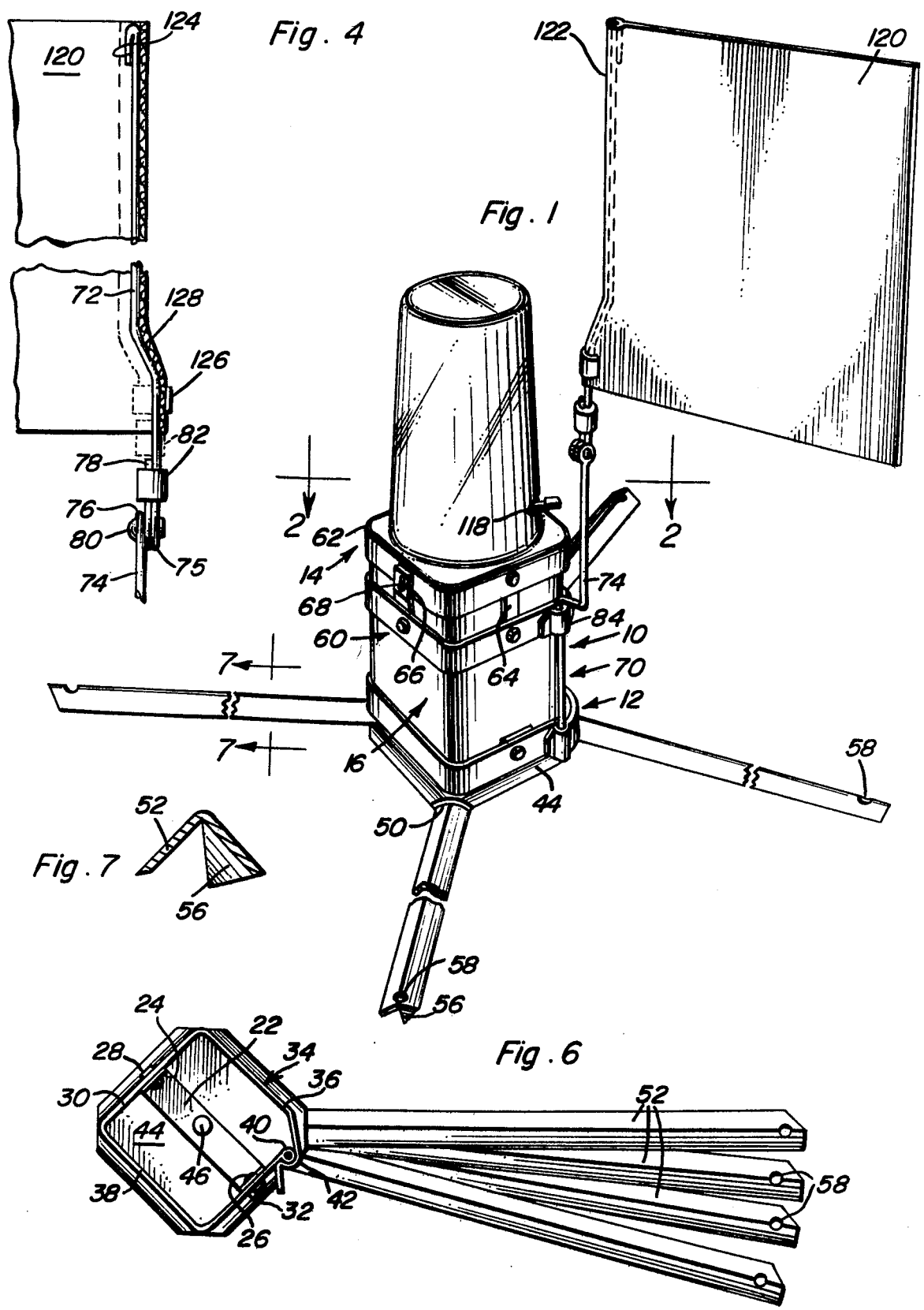
FIG. 1 is a perspective view of the signal light of the instant invention with the selectively usable flag portion thereof supported therefrom and with the selectively usable base also in operative association with the remainder of the signal lamps.

Referring now more specifically to the drawings, the numeral 10 generally designates the signal lamp of the instant invention. The signal lamp includes a lower base structure referred to in general by the reference numeral 12 and an upper light assembly referred to in general by the reference numeral 14. The structure 12 and assembly 14 are designed for use in conjunction with a standard upright storage battery referred to in general by the reference numeral 16 and of the type including a pair of upwardly projecting and upwardly tapering coil spring terminals 18 and 20. see FIG. 3.

The base structure includes a main horizontal strap member 22 with upturned right angled opposite ends 24 and 26. The upturned ends 24 and 26 are riveted as by rivets 28 to the mid-portions of opposite sides 30 and 32 of a base band-type clamp 34 formed to include an additional pair of opposite sides 36 and 38 extending between corresponding ends of the sides 30 and 32.

The end of the side 32 remote from side 38 includes an outwardly coiled portion 40 and the end of the side 36 remote from the side 30 includes a spring hook defining extension 42 which is hookingly engageable with the coiled portion 40 in order to clamp the band-type clamp 34 about the lower portion of the storage battery 16.

The central portion of a square mounting plate 44 is riveted to the central portion of the underside of the member 22 by means of a rivet 46 and the corner portions of the mounting plate 44 are clipped on the bias and the marginal edges of the mounting plate 44 are curved downwardly in order that the clipped corner portions thereof may define downwardly opening channels 50 extending generally radially of the rivet 46. The inner ends of a plurality of inverted V-shaped and generally radially and outwardly extending legs 52 are pivotally anchored to the rivet 46 and the legs 52 are swingable from the collapsed nested positions thereof as illustrated in FIG. 6 of the drawings with the legs frictionally engaged with each other against displacement from the collapsed position thereof to the operative positions thereof as illustrated in FIG. 1 of the drawings with the inner end portions of the legs 52 embracingly engaged in the channels 50 and thus frictionally retained in the operative position. In addition, one flange portion of the outer end of each leg 52 is bent downwardly as at 56 to provide a support surface engaging tip and the outer end of each leg 52 is apertured as at 58 for ready anchoring to a support surface.

Figure 3:
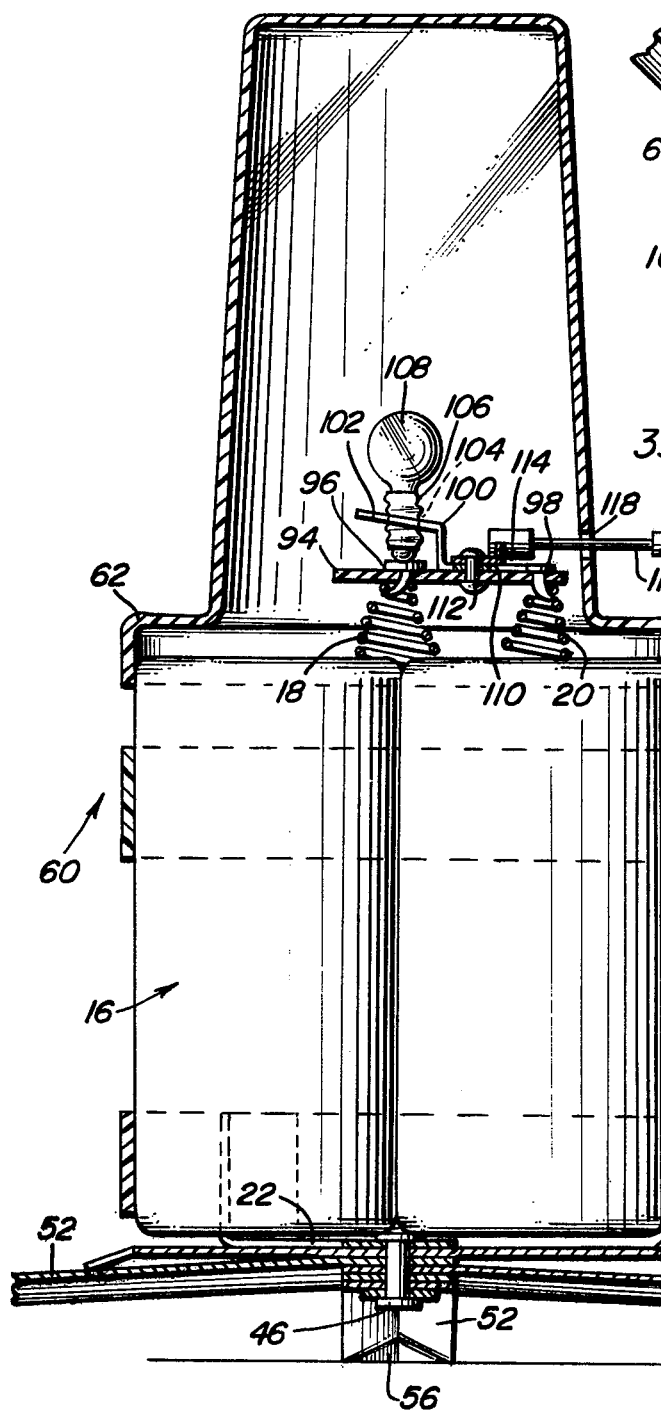
FIG. 3 is an enlarged fragmentary vertical sectional view taken substantially upon the plane indicated by the sectional lines 3—3 of FIG. 2
Figure 5:
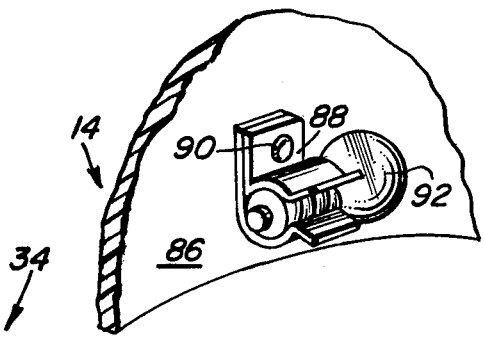
FIG. 5 is an enlarged fragmentary perspective view illustrating the manner in which a spare bulb retaining clip is supported from the interior of the lens portion of the signal lamp.

The lamp assembly 14 includes a lower band-type clamp 60 which is similar to the clamp 34, and a downwardly opening lens body 62 telescopingly engageable over the upper end of the battery 16 in a manner which will be apparent from FIGS. 1 and 3 of the drawings. The lens body is secured to opposite side portions of the clamp 60 by means of support straps 64 and the clamp 60 further includes an upstanding and outwardly offset support flange 66 including an inverted keyhold opening 68 formed therein by which the signal light 10 may be supported from the head of a protruding nail.

A signal flag assembly referred to in general by the reference numeral 70 is provided and includes upper and lower support rods 72 and 74. The lower end of the upper rod 72 has an eye 75 formed therein and the upper end of the rod 74 includes a loop 76 formed therein including an upward vertical extension 78. A pivot fastener 80 pivotally secures the eye 75 to the loop 76 and a locking sleeve 82 is slidable on the rod 72 from the dotted line position thereof illustrated in FIG. 4 to the lowered solid line position thereof. In the elevated position, the locking sleeve 82 is elevated above the extension 78 and the rod 72 may be pivoted relative to the rod 74. However, when the rod 72 is illustrated as positioned in FIGS. 1 and 4 of the drawings, the locking sleeve 82 may be shifted downwardly from the phantom line position illustrated in FIG. 4 to the solid line position of FIG. 4 in order to lock the rod 72 in the upright position. The mid-portion of the rod 74 includes a right-angled horizontally directed portion 84 and that portion of the rod 74 that is disposed below the portion 84 is slidingly receivable downwardly through the outwardly coiled portions of the band-type clamps 34 and 60, the horizontal portion 84 being engageable with the upper band-type clamp 60 to limit downward movement of the lower portion of the rod 74 through the outwardly coil portions of the clamps 34 and 60.

An inner peripheral portion 86 of the lens assembly 14 has a spring clip 88 supported therefrom by means of a rivet 90 and the spring clip 88 removably supports a spare bulb 92.

Figure 2:
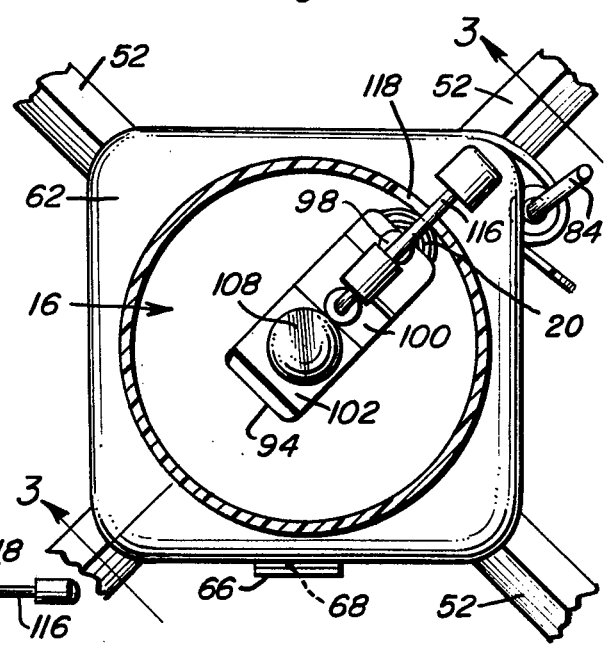
FIG. 2 is an enlarged fragmentary horizontal sectional view taken substantially upon the plane indicated by the sectional lines 2—2 of FIG. 1.

With attention invited now more specifically to FIGS. 2 and 3 of the drawings, it will be seen that there is provided a horizontal panel 94 of dielectric material having a pair of vertical contacts or terminals 96 and 98 secured therethrough. The terminals 96 and 98 include lower portions which project below the panel 94 and are downwardly divergent and spaced apart a distance slightly greater than the spacing between the upper ends of the coil springs 18 and 20. In addition, those portions of the terminals 96 and 98 which project below the panel 94 are frictionally and electrically engageable with the upper ends of the coil spring terminals 18 and 20, when the latter are spread slightly apart. In this manner, the panel 94 is suitably supported from the upper ends of the coil spring terminals 18 and 20 with the terminals 96 and 98 in electrical contact with the terminals 18 and 20.

A horizontally disposed generally Z-shaped conductive strip 100 includes an elevated end portion 102 provided with a vertical bore 104 through which the threaded base of a bulb 108 may be threadedly engaged. The strip 100 also includes a lower end 110 which is rivted to a central portion of the dielectric panel 94 by means of a rivet 112. A switch blade 114 is also pivoted from the panel 94 by means of the rivet 112 and has its end through which the rivet 112 is secured in electrical contact with the conductive strip 100. The free end of the blade 114 includes an endwise outwardly projecting handle portion 116 which is swingably received through a horizontal slot 118 provided in the lens assembly 14. Accordingly, the blade 114 may be swung into an in-line position with the strip 100 and the free end of the blade in electrical contact with the terminal 98.

The rod 72 has a flexible panel-like flag element 120 supported therefrom. One vertical marginal edge portion of the flag element 120 includes a hem 122 and the upper end of the rod 72 is bent downwardly back upon itself as at 124. Also, the upper end of the rod 72 is telescoped into the hem 122 and the flag element 120 carries a clip 126 adjacent the lower end of the hem 122 whereby the flag element is clipped in position on the rod 72 with the clip 126 disposed below an angulated portion 128 in a lower portion of the rod 72.

In operation, the signal light 10 may be utilized either with or without the base structure 12. If the base structure 12 is to be omitted, the lower end of the storage battery 16 may be rested upon a suitable support surface and the lamp assembly 14 may be supported from the upper end of the storage battery 16. On the other hand, the band-type clamp 34 may be utilized to clampingly secure the base structure 12 to the lower end of the storage battery 16.

If it is desired, the outer end arm portion 116 of the blade 114 may be removably engaged with the blade 114 in order that the lens assembly 14 may be removed with the band-type clamp 60 from the upper end of the storage battery 16 independently of the panel 94 and the structure supported therefrom. In this manner, engagement of the terminals 96 and 98 with the terminals 18 and 20 may be accomplished more easily. Due to the resiliency of the terminals 18 and 20, once the terminals 96 and 98 have been engaged therewith in the manner illustrated in FIG. 3 of the drawings, the panel 94 is stationarily supported from the upper ends of the terminals 18 and 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a storage battery of the type including a pair of generally parallel, spaced and outwardly projecting contact terminal defining resilient coil springs, a terminal mount assembly comprising a body of dielectric material for disposition outwardly of and supported from the outer ends of said springs, a pair of spaced terminal ends supported from and projecting outwardly from said body, the spacing between said terminal ends being slightly different than the spacing between the free ends of said springs with said free ends being slightly displaced relative to each other to match the spacing between said terminal ends and the latter removably telescoped into the free ends of said springs to thus support said terminal ends and the body, from which said terminal ends are supported, solely from said springs and thus from said battery.

2. The combination of claim 1 wherein said terminal ends are at least slightly oppositely inclined relative to each other with each inclined terminal and inclined outwardly in generally the same direction the corresponding coil spring free end is displaced from its static position.

3. The combination of claim 1 wherein said body comprises a panel member disposed generally normal to said coil springs, said terminal ends comprising end extensions of terminal members secured through said panel member.

4. The combination of claim 3 including an elongated conductive tubular bulb socket supported from said body in endwise alignment with and spaced from one of said terminal members on the side of said body remote from which said terminal ends project for engagement of the center contact of a bulb seated in said socket with said one terminal member, and conductive circuit make and break means shiftably supported from said body for movement into and out of position electrically connecting said socket and the other terminal member.

5. The combination of claim 4 wherein said terminal ends are at least slightly oppositely inclined relative to each other with each inclined terminal end inclined outwardly in generally the same direction the corresponding coil spring free end is displaced from its static position.

6. The combination of claim 1 wherein said coil springs taper in diameter outwardly from said battery.

7. The combination of claim 1 wherein said terminal ends diverge outwardly from said body.

* * * * *